(12) United States Patent
Sun et al.

(10) Patent No.: US 11,671,220 B2
(45) Date of Patent: *Jun. 6, 2023

(54) SOUNDING REFERENCE SIGNAL TRANSMISSION AND CONFIGURATION METHODS, USER EQUIPMENT, AND NETWORK SIDE DEVICE

(71) Applicant: VIVO MOBILE COMMUNICATION CO., LTD., Dongguan (CN)

(72) Inventors: Xiaodong Sun, Dongguan (CN); Peng Sun, Dongguan (CN); Wei Xi, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,768

(22) Filed: Jul. 21, 2022

(65) Prior Publication Data

US 2022/0360379 A1 Nov. 10, 2022

Related U.S. Application Data

(63) Continuation of application No. 17/029,051, filed on Sep. 23, 2020, now Pat. No. 11,431,455, which is a (Continued)

(30) Foreign Application Priority Data

Apr. 3, 2018 (CN) .......................... 201810298563.1

(51) Int. Cl.
  *H04L 5/00* (2006.01)
  *H04W 52/14* (2009.01)
  *H04W 72/21* (2023.01)

(52) U.S. Cl.
  CPC ........... *H04L 5/005* (2013.01); *H04W 52/146* (2013.01); *H04W 72/21* (2023.01)

(58) Field of Classification Search
  CPC .. H04L 5/005; H04W 52/146; H04W 72/0413
  (Continued)

(56) References Cited

U.S. PATENT DOCUMENTS

| 2013/0215811 A1* | 8/2013 | Takaoka | H04W 28/0268 370/311 |
| 2014/0219232 A1* | 8/2014 | Takeda | H04W 52/325 370/329 |
| 2015/0245347 A1* | 8/2015 | Yi | H04B 7/06 370/280 |

OTHER PUBLICATIONS

First Office Action issued in related Chinese application No. 201810298563.1, dated Apr. 9, 2020, 7 pages.
(Continued)

*Primary Examiner* — Chi Tang P Cheng
(74) *Attorney, Agent, or Firm* — IPX PLLC

(57) ABSTRACT

The present disclosure provides sounding reference signal transmission and configuration methods, user equipment, and a network side device. The method for sounding reference signal (SRS) transmission includes receiving uplink resources of at least one cell from a network side device, where the uplink resources of each of the at least one cell comprise one or more SRS resource sets. The method further includes selecting, according to a predefined rule, at least one SRS resource set of each of the at least one cell for sending, when in a scenario in which an SRS switches between carriers for sending, where the scenario is configured by the network side device.

12 Claims, 4 Drawing Sheets

Receive uplink resources of at least one cell from a network side device, where the uplink resources of each of the cells includes at least one SRS resource set — 101

When in a scenario in which an SRS switches between carriers for sending, select, according to a preset rule, at least one SRS resource set on each of the cells for sending, where the scenario is configured for the network side device — 102

Related U.S. Application Data continuation of application No. PCT/CN2019/080094, filed on Mar. 28, 2019.

(58) Field of Classification Search
USPC .......................................................... 370/329
See application file for complete search history.

(56) References Cited

OTHER PUBLICATIONS

Vivo, "Remaining issues and proposals on SRS design", 3GPP TSG-RAN WG1 Meeting AH 1801, R1-1800192, Jan. 13, 2018.

\* cited by examiner

SOUNDING REFERENCE SIGNAL TRANSMISSION AND CONFIGURATION METHODS, USER EQUIPMENT, AND NETWORK SIDE DEVICE

CROSS-REFERENCE TO RELATED APPLICATIONS

This application is a continuation of U.S. application Ser. No. 17/029,051, filed on Sep. 23, 2020 know U.S. Pat. No. 11,431,455), which is a continuation of International Application No. PCT/CN2019/080094, filed on Mar. 28, 2019, which claims priority to Chinese Patent Application No. 201810298563.1, field on Apr. 3, 2018. The entire contents of each of the above-identified applications are expressly incorporated herein by reference.

TECHNICAL FIELD

The present disclosure relates to the field of communications technologies, in particular to sounding reference signal transmission and configuration methods, user equipment, and a network side device.

BACKGROUND

In the 5th Generation (5G) mobile communications system, based on different functions of Sounding Reference Signals (SRS), SRSs can be used for beam management, codebook-based transmission, non-codebook-based transmission and antenna switching for sending. User Equipment (UE) can obtain a plurality of SRS resource sets and configurations through higher-layer signaling. The configuration of each of the SRS resource sets includes its usage, periodical characteristics, etc.

In a scenario of Carrier Aggregation (CA), when high-layer signaling is configured with a plurality of SRS resource sets for transmission, how to select an SRS resource set for SRS carrier switching is uncertain, which may lead to improper selection of resources for SRS carrier switching, thereby resulting in abridged channel information acquired or resource waste, and a decline in the system transmission rate.

SUMMARY

Embodiments of the present disclosure provide sounding reference signal transmission and configuration methods, user equipment, and a network side device.

According to a first aspect, an embodiment of the present disclosure provides an SRS transmission method applied to user equipment, where the method includes:

receiving uplink resources of at least one cell from a network side device, where the uplink resources of each cell includes at least one SRS resource set; and selecting, according to a predefined rule, at least one SRS resource set of each of the cells for sending when in a scenario in which an SRS switches between carriers for sending, where the scenario is configured by the network side device.

According to a second aspect, an embodiment of the present disclosure further provides an SRS configuration method applied to a network side device, where the method includes:

sending uplink resources of at least one cell to user equipment, where the uplink resources of each of the cells include at least one SRS resource set; and configuring, for the user equipment, a scenario in which an SRS switches between carriers for sending, so that the user equipment selects, according to a predefined rule, at least one SRS resource set of each of the cells for sending.

According to a third aspect, an embodiment of the present disclosure further provides user equipment, including:

a receiving module, configured to receive uplink resources of at least one cell from a network side device, where the uplink resources of each of the cells include at least one SRS resource set; and a processing module, configured to select, according to a predefined rule, at least one SRS resource set of each of the cells for sending when in a scenario in which an SRS switches between carriers for sending, where the scenario is configured by the network side device.

According to a fourth aspect, an embodiment of the present disclosure further provides a network side device, including:

a sending module, configured to send uplink resources of at least one cell to user equipment, where the uplink resources of each of the cells include at least one SRS resource set; and a configuration module, configured to configure, for the user equipment, a scenario in which an SRS switches between carriers for sending, so that the user equipment selects, according to a predefined rule, at least one SRS resource set of each of the cells for sending.

According to a fifth aspect, an embodiment of the present disclosure further provides user equipment, including a memory, a processor, and a computer program which is stored on the memory and can run on the processor, where the computer program, when executed by the processor, implements the steps of the foregoing SRS transmission method.

According to a sixth aspect, an embodiment of the present disclosure further provides a network side device, including: a memory, a processor, and a computer program which is stored on the memory and can run on the processor, where the computer program, when executed by the processor, implements steps of the foregoing SRS configuration method.

According to a seventh aspect, an embodiment of the present disclosure further provides a computer readable storage medium, where the computer readable storage medium stores a computer program, the computer program, when executed by a processor, implements the steps of the SRS transmission method or the steps of the SRS configuration method.

The embodiments of the present disclosure have the following beneficial effects:

In the foregoing solutions, when in a scenario in which the SRS switches between carriers for sending, the user equipment selects, according to the predefined rule, at least one SRS resource set of each of the cells for sending. The technical solutions of the present embodiments can obtain unabridged channel state information, and enhance the system transmission rate.

BRIEF DESCRIPTION OF DRAWINGS

The following describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes exemplary embodiments of the present disclosure in further detail with reference to accompanying drawings. Although the accompanying drawings show exemplary embodiments of the present disclosure, it should be understood that the present disclosure may be implemented in various manners and shall not be limited to the embodiments described herein. On the contrary, these embodiments are provided to understand the present disclosure more thoroughly and allow a person skilled in the art to comprehend the scope of the present disclosure.

In the specification and claims of this application, terms such as "first" and "second" are used for distinguishing similar objects, and are not necessarily used to describe a particular order or sequence. It should be understood that such used data is exchangeable in a proper case, so that the embodiments of the present disclosure described herein, for example, can be implemented in sequences other than those shown in the figures or described herein. In addition, terms "include" and "comprise" and any variation thereof are intended to cover non-exclusive inclusion. For example, processes, methods, systems, products, or devices including a series of steps or units are not necessarily limited to these clearly listed steps or units, and instead may include other steps or units not clearly listed or inherent to these processes, methods, products, or devices.

An SRS supports power control related to a Physical Uplink Shared Channel (PUSCH) or separate power control. When SRS power control is associated with PUSCH, SRS closed loop power control depends on PUSCH closed loop power control. When SRS power control is separate from the PUSCH, SRS power control does not support separate closed loop power control based on an SRS resource set, and supports only one closed loop power control process for all SRS resource sets. This means that when the UE configured on the network side sends a plurality of SRS resource sets at the same time, the adjustment amounts of the closed loop power control of all SRS resource sets are the same. When the high-layer signaling is configured with separate SRS power control, since the SRS resource sets have different usage, if all SRS resource sets adopt the same closed loop power control, the configuration flexibility of the SRS resource sets will be limited, leading to power adjustment not in time.

To resolve the problem of selection of the SRS resource set for the SRS carrier switching for sending and the problem of closed loop power control based on the SRS resource set, the embodiments of the disclosure provide SRS transmission and configuration methods, user equipment, and a network side device.

Figure 1:
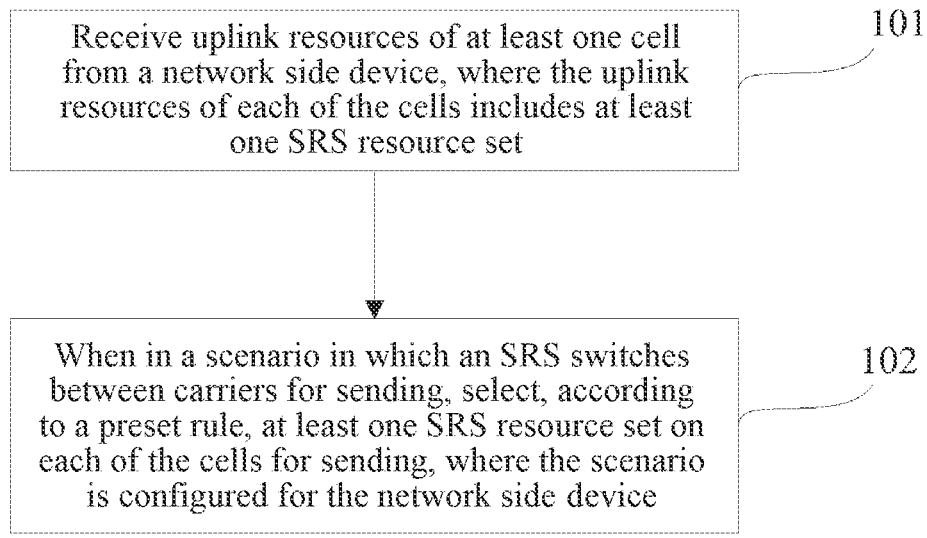
FIG. 1 is a schematic flowchart of an SRS transmission method according to an embodiment of the present disclosure.

An embodiment of the present disclosure provides an SRS transmission method applied to user equipment, as shown in FIG. 1, where the method includes the following steps:

Step 101: Receive uplink resources of at least one cell from a nets network side device, where the uplink resources of each of the cells include at least one SRS resource set.

Step 102: Select, according to a predefined rule, at least one SRS resource set of each of the cells for sending, when in a scenario in which an SRS switches between carriers for sending, where the scenario is configured by the network side device.

In this embodiment, when in a scenario in which the SRS switches between carriers for sending, the user equipment selects, according to the predefined rule, at least one SRS resource set of each of the cells for sending. The technical solution of the present embodiment can obtain unabridged channel state information, and enhance the system transmission rate.

Further, the selecting, according to a predefined rule, at least one SRS resource set of each of the cells for sending includes at least one of the following:

selecting an SRS resource sets for the usage of beam management, codebook-based transmission, non-codebook-based transmission, and antenna switching;

selecting an SRS resource sets for the same usage as those on a cell currently with the PUSCH transmission; and selecting an SRS resource set with an SRS resource set mark of N, where N is an integer not smaller than 0, for example, selecting an SRS resource set with an SRS resource set mark of 0 for sending.

When receiving the uplink resources from a plurality of cells, the user equipment can select the SRS resource set of each of the plurality of cells according to one of the foregoing methods; or the user equipment can select the SRS resource set of one of the cells according to one of the foregoing methods, and select the SRS resource sets of the other cells according to another one of the foregoing methods.

Further, when the UE does not expect SRS carrier switching for sending, and the network side device is configured with more than one SRS resource set of a cell without PUSCH transmission, the method further includes:

receiving one SRS resource set configured by the network side device of the cell without PUSCH transmission.

The number of the cell without PUSCH transmission may be one or above. For each of the cells without PUSCH transmission, the network side device is configured with only one SRS resource set.

Further, the method also includes:

receiving an SRS power control indication from the network side device, where the SRS power control indication is used to indicate the reduced or increased transmission power of at least one SRS resource set of one cell.

In this way, when the high-layer signaling is configured with separate SRS power control, the user equipment can implement flexible and timely SRS power control according to the adjustment amount of the separate closed loop power control for each of the SRS resource sets.

If the high-layer signaling is configured with a first type (typeA-SRS-TPC-PDCCH-Group type) of power increase or reduction command, the SRS power control indication includes one SRS transmission request and a transmission power indication of at least one SRS resource set list. The one SRS transmission request corresponds to the transmission power indication of the at least one SRS resource set list, used for indicating the reduced value or increased value of the transmission power of the SRS resource set list. One SRS resource set list corresponds to one SRS resource set of at least one cell.

If the high-layer signaling is configured with a second type (typeB-SRS-TPC-PDCCH-Group type) of power increase or reduction command, the SRS power control indication includes at least one SRS transmission request and at least one SRS resource set transmission power indication. The SRS transmission request corresponds to the SRS resource set transmission power indication one by one. One SRS resource set transmission power indication corresponds to the reduced value or increased value of the transmission power of one SRS resource set of one cell. Specifically, the SRS power control indication can be Downlink Control Information (DCI).

Figure 2:
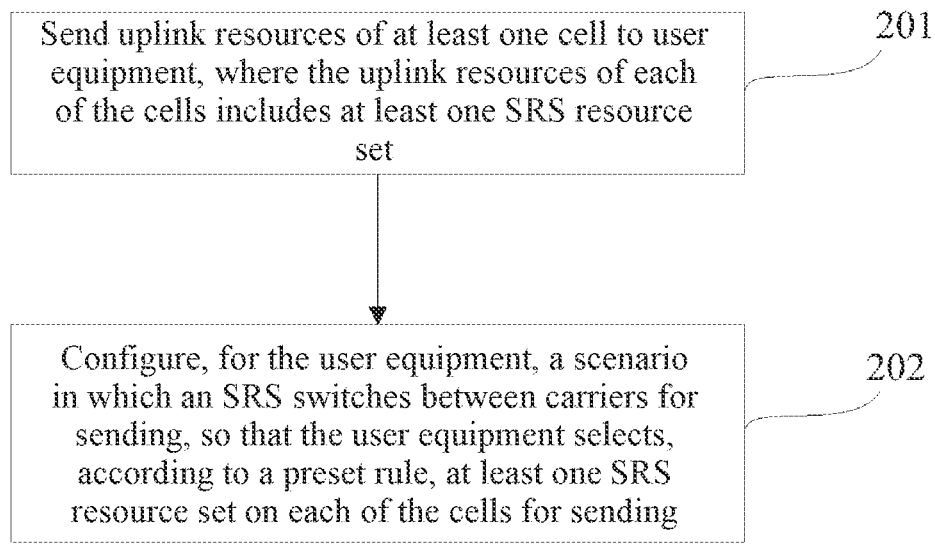
FIG. 2 is a schematic flowchart of an SRS configuration method according to an embodiment of the present disclosure.

An embodiment of the present disclosure further provides an SRS configuration method applied to a network side device, as shown in FIG. 2, where the method includes the following steps:

Step 201: Send uplink resources of at least one cell to user equipment, where the uplink resources of each of the cells include at least one SRS resource set.

Step 202: Configure, for the user equipment, a scenario in which an SRS switches between carriers for sending, so that the user equipment selects, according to a predefined rule, at least one SRS resource set of each of the cells for sending.

Further, when the UE does not expect SRS carrier switching for sending, and the network side device is configured with more than one SRS resource set of a cell without PUSCH transmission, the sending uplink resources of at least one cell to user equipment include:

sending uplink resources of a cell without PUSCH transmission to the user equipment, where the uplink resources of a cell without PUSCH transmission includes an SRS resource set.

The number of the cell without PUSCH transmission may be one or above. For each of the cells without PUSCH transmission, the network side device is configured with only one SRS resource set.

Further, the method also includes:

sending an SRS power control indication to the user equipment, where the SRS power control is used to indicate the reduced or increased transmission power of at least one SRS resource set of one cell.

In this way, when the high-layer signaling is configured with separate SRS power control, a separate adjustment amount of the closed loop power control is given to each of the SRS resource sets, realizing flexible and timely SRS power control.

Further, the SRS power control indication includes an SRS transmission request and a transmission power indication of at least one SRS resource set list; the SRS transmission request corresponds to the transmission power indication of the at least one SRS resource set list, used for indicating the reduced value or increased value of the transmission power of one SRS resource set list; and one SRS resource set list corresponds to one SRS resource set list of at least one cell.

Further, the SRS power control indication includes at least one SRS transmission request and at least one SRS resource set transmission power indication; the at least one SRS transmission request corresponds to the at least one SRS resource set transmission power indication one by one; and one SRS resource set transmission power indication corresponds to the reduced value or increased value of the transmission power of one SRS resource set of one cell.

The technical solution of the present disclosure will be described in detail below with reference to specific embodiments:

Embodiment 1

In a CA scenario, a network side device may respectively configure uplink resources for a primary cell PCell and a subsidiary cell set (SCell_1, SCell_2, SCell_3), where the uplink resources of each of the cells may be configured with a plurality of SRS resource sets, as shown in Table 1. It is assumed that the periodical configuration of the SRS resource sets on the PCell/SCell_1/SCell_2/SCell_3 is slot T, and the slot offset is 0/1/2/3, respectively.

TABLE 1

| Cell name | SRS resource set mark | | | |
|---|---|---|---|---|
| | Beam management | Codebook | non-Codebook | Antenna Switching |
| PCell | 0 | 1 | 2 | 3 |
| SCell_1 | 0 | 1 | 2 | 3 |
| SCell_2 | 0 | 1 | 2 | 3 |
| SCell_3 | 0 | 1 | 2 | 3 |

Figure 3:
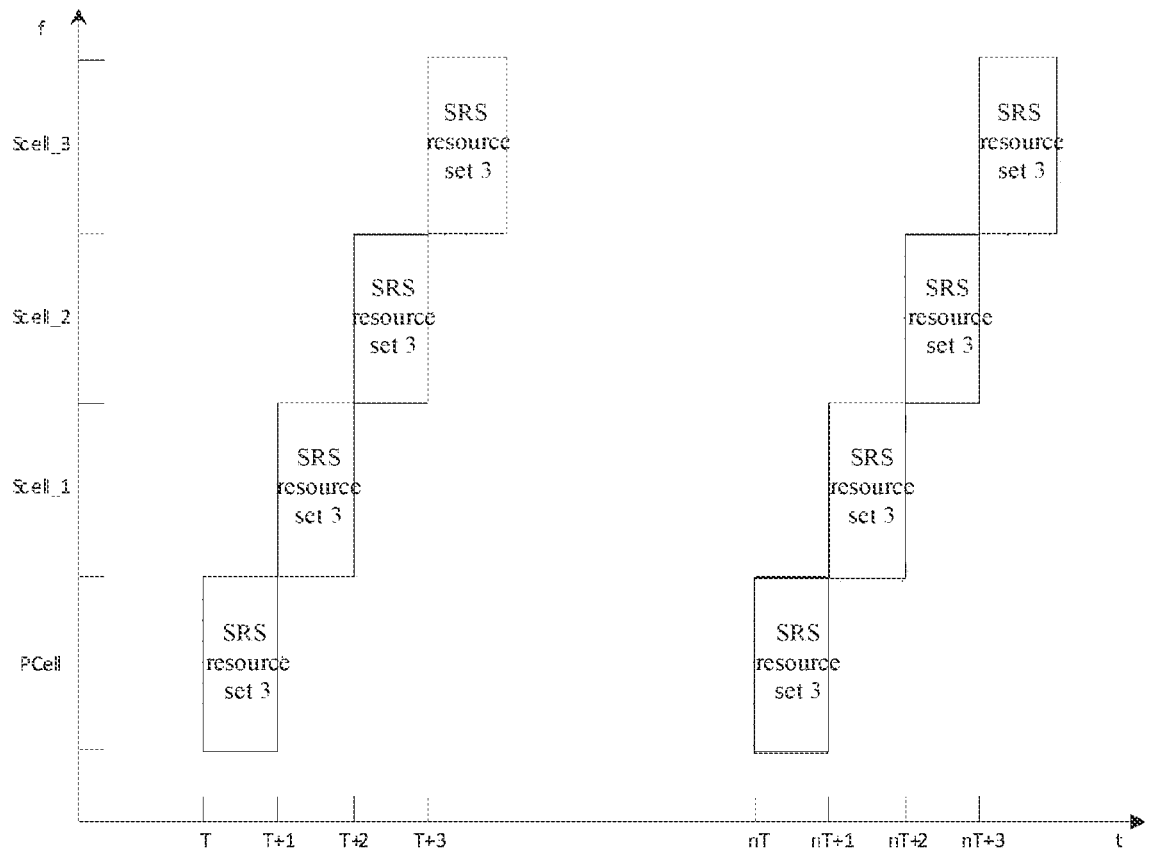
FIG. 3 is a schematic diagram of SRS transmission according to an embodiment of the present disclosure.

When the high-layer signaling is configured with SRS carrier switching for sending, the UE will select an SRS resource set for the usage of Antenna Switching for transmission. As shown in FIG. 3, on the PCell, the UE will send an SRS resource set 3 by a cycle of T and a slot offset of 0; on the SCell_1, the UE will send the SRS resource set 3 by a cycle of T and a slot offset off; on the SCell_2, the UE will send the SRS resource set 3 by a cycle of T and a slot offset of 2; and on the SCell_3, the UE will send the SRS resource set 3 by a cycle of T and a slot offset of 3.

Embodiment 2

UE may receive, from a network side device, separate SRS power control configured for high-layer signaling, a first type of power increase or reduction command is adopted, and SRS resource sets include SRS resource sets 0, 1, 2 and 3. It is assumed that in a DCI format, the SRS power increase or reduction command is (1, −1, +1), which respectively represents (SRS request domain value, power increase or reduction command for SRS resource set 0, and power increase or reduction command for SRS resource set 1). The SRS request domain value is 2, corresponding to a first SRS list, which includes SRS resource sets 0 and 1.

In the DCI format, the definition of the SRS request domain can be seen in Table 2.

TABLE 2

| SRS request domain value | Description of SRS non-carrier switching |
|---|---|
| '00' | No type 1 SRS resource sets triggered or all type 1 SRS resource sets triggered |
| '01' | Type 1SRS in the first SRS resource set list triggered |
| '10' | Type 1SRS in the second SRS resource set list triggered |
| '11' | Type 1SRS in the third SRS resource set list triggered |

According to the high-layer signaling and the DCI indication, the transmission power of all SRS resources in the SRS resource set 0 will start to decline by 1 dB at the indicated time moment until the UE receives the next DCI indication; and the transmission power of all SRS resources in the SRS resource set 1 will start to increase by 1 dB until the UE receives the next DCI indication.

Embodiment 3

UE may receive, from a network side device, separate SRS power control configured for high-layer signaling, a second type of power increase or reduction command is adopted, and SRS resource sets include SRS resource sets 0, 1 and 2. It is assumed that in a DCI format, the SRS power increase or reduction command is ('01', −1), ('10', 0) and ('11', +1), which respectively represents (SRS request domain value, and power increase or reduction command for SRS resource set N).

In the DCI format, the definition of the SRS request domain can be seen in table 3.

TABLE 3

| SRS request domain value | Description of SRS non-carrier switching |
| --- | --- |
| '00' | No type 1 SRS resource sets triggered or all type 1 SRS resource sets triggered |
| '01' | Type 1 SRS in the first SRS resource set triggered |
| '10' | Type 1 SRS in the second SRS resource set triggered |
| '11' | Type 1 SRS in the third SRS resource set triggered |

According to the high-layer signaling and the DCI indication, the transmission power of all SRS resources in the SRS resource set 1 will start to decline by 1 dB until the UE receives the next DCI indication; the transmission power of all SRS resources in the SRS resource set 2 will start to increase by 0 dB until the UE receives the next DCI indication; and the transmission power of all SRS resources in the SRS resource set 3 will start to increase by 1 dB until the UE receives the next indication.

In this embodiment, when the network side device is configured with SRS carrier switching for sending, the user equipment selects, according to the predefined rule, at least one SRS resource set of each of the cells for sending. The technical solution of the present embodiment can effectively obtain unabridged channel state information, and enhance the system transmission rate. At the same time, when the high-layer signaling is configured with separate SRS power control, a separate adjustment amount of the closed loop power control is given to each of the SRS resource sets, realizing flexible and timely SRS power control.

Figure 4:
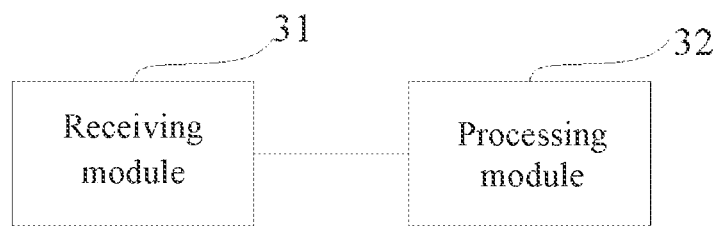
FIG. 4 is a schematic structural diagram of user equipment according to an embodiment of the present disclosure.

An embodiment of the present disclosure further provides user equipment, as shown in FIG. 4, including:

a receiving module 31, configured to receive uplink resources of at least one cell from a network side device, where the uplink resources of each of the cells include at least one SRS resource set; and a processing module 32, configured to select, according to a predefined rule, at least one SRS resource set on each cell for sending, when in a scenario in which the SRS switches between carriers for sending, where the scenario is configured by the network side device.

In this embodiment, when in a scenario in which the SRS switches between carriers for sending, the user equipment selects, according to the predefined rule, at least one SRS resource set of each of the cells for sending. The technical solution of the present embodiment can effectively obtain unabridged channel state information, and enhance the system transmission rate.

Further, the processing module 32 is specifically configured to perform at least one of the following steps:

selecting an SRS resource sets for usage of beam management, codebook, non-codebook and antenna switching;

selecting one of the SRS resource sets for the same purpose as those on a cell currently with the PUSCH transmission; and selecting an SRS resource set with an SRS resource set mark of N, where N is an integer not less than 0.

Further, the receiving module 31 is further configured to receive one SRS resource set configured by the network side device of the cell without PUSCH transmission.

Further, the receiving module 31 is further configured to receive SRS power control indication from the network side device, where the SRS power control indication is used to indicate the reduced or increased transmission power of at least one SRS resource set of one cell.

Further, the SRS power control indication includes an SRS transmission request and a transmission power indication of at least one SRS resource set list, and the SRS transmission request corresponds to the transmission power indication of the at least one SRS resource set list.

Further, the SRS power control indication includes at least one SRS transmission request and at least one SRS resource set transmission power indication, and the at least one SRS transmission request corresponds to the at least one SRS resource set transmission power indication one by one.

Figure 5:
FIG. 5 is a schematic structural diagram of a network side device according to an embodiment of the present disclosure.

An embodiment of the present disclosure further provides a network side device, as shown in FIG. 5, including:

a sending module 41, configured to send uplink resources of at least one cell to user equipment, where the uplink resources of each of the cells include at least one SRS resource set;

a configuration module 42, configured to configure, for the user equipment, a scenario in which an SRS switches between carriers for sending, so that the user equipment selects, according to a predefined rule, at least one SRS resource set of each of the cells for sending.

Further, the sending module 41 is also configured to send uplink resources of a cell without PUSCH transmission sent to the user equipment, and the uplink resources of the cell without PUSCH transmission include an SRS resource set.

Further, the sending module 41 is also configured to send an SRS power control indication to the user equipment, and the SRS power control is used to indicate the reduced or increased transmission power of at least one SRS resource set of one cell.

Further, the SRS power control indication includes an SRS transmission request and a transmission power indication of at least one SRS resource set list, and the SRS transmission request corresponds to the transmission power indication of the at least one SRS resource set list.

Further, the SRS power control indication includes at least one SRS transmission request and at least one SRS resource set transmission power indication, and the at least one SRS transmission request corresponds to the at least one SRS resource set transmission power indication one by one.

An embodiment of the present disclosure further provides a network side device, including: a memory, a processor, and a computer program which is stored on the memory and can run on the processor. When executed by the processor, the computer program implements steps of the SRS configuration method.

Figure 6:
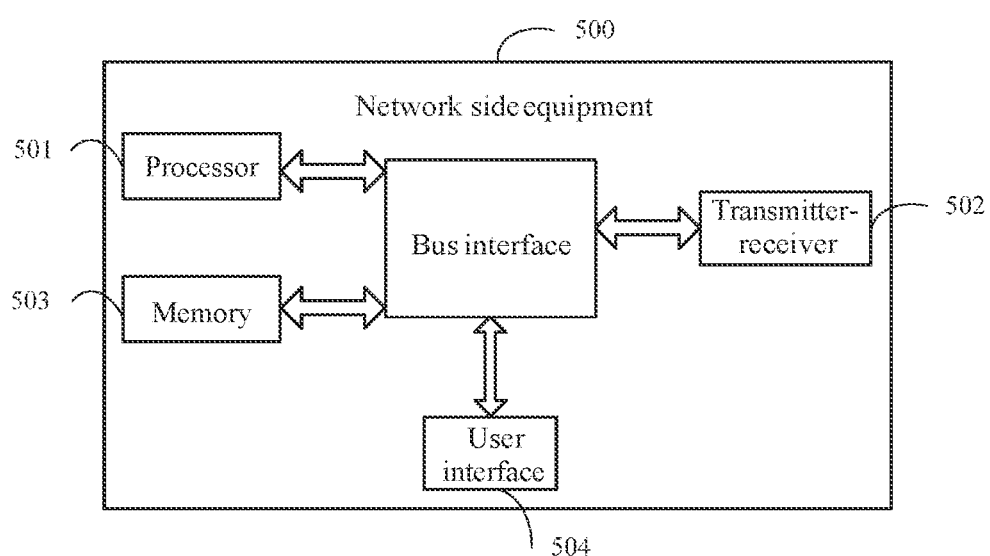
FIG. 6 is a schematic diagram of composition of user equipment according to an embodiment of the present disclosure.

FIG. 6 is a structural diagram of the network side device applied in this embodiment of the present disclosure. The network side device can implement details of the SRS configuration method in the above mentioned embodiments, and the same effects can be achieved. As shown in FIG. 6, the network side device 500 includes: a processor 501, a transmitter-receiver 502, a memory 503, a user interface 504, and a bus interface.

In this embodiment, the network side device 500 further includes: a computer program which is stored on the memory 503 and can run on the processor 501. When executed by the memory 501, the computer program implements the following steps: sending uplink resources of at least one cell to user equipment, where the uplink resources of each of the cells include at least one SRS resource set; and configuring, for the user equipment, a scenario in which an SRS switches between carriers for sending, so that the user equipment selects, according to a predefined rule, at least one SRS resource set of each of the cells for sending.

In FIG. 6, a bus architecture can include any number of buses and bridges, which are mutually connected by means of various circuits of the processor 501 on behalf of one or more processors and the memory 503 on behalf of memories. The bus architecture can further connect together various other circuits such as peripheral equipment circuit, voltage regulator circuits and power management circuit, which are known in this art and therefore will not be described in further detail herein. The user interface provides an interface. The transmitter-receiver 502 can include a plurality of elements, namely a transmitter and a receiver, providing units in communication with various other devices on the transmission medium. Aiming at different user equipment, the user interface 504 can further be an interface in external and internal connection with required equipment. The equipment connected includes, but is not limited to a key pad. a display, a loudspeaker, a microphone, a joystick, and the like.

The processor 501 is responsible for management on and general processing of the bus architecture. The memory 503 can store data used by the processor 501 during operation execution.

When executed by the processor 501, the computer program further implements the following step: sending uplink resources of a cell without PUSCH transmission to the user equipment, where the uplink resources of the cell without PUSCH transmission include one SRS resource set.

When executed by the processor 501, the computer program further implements the following step: sending an SRS power control indication to the user equipment, where the SRS power control indication is used to indicate the reduced or increased power of at least one SRS resource set of one cell.

Further, the SRS power control indication includes an SRS transmission request and a transmission power indication of at least one SRS resource set list, and the SRS transmission request corresponds to the transmission power indication of the at least one SRS resource set list.

Further, the SRS power control indication includes at least one SRS transmission request and at least one SRS resource set transmission power indication, and the at least one SRS transmission request corresponds to the at least one SRS resource set transmission power indication one by one.

An embodiment of the present disclosure further provides user equipment, including a memory, a processor and a computer program which is stored on the memory and can run on the processor. When executed by the processor, the computer program implements the steps of the foregoing SRS transmission method.

Figure 7:
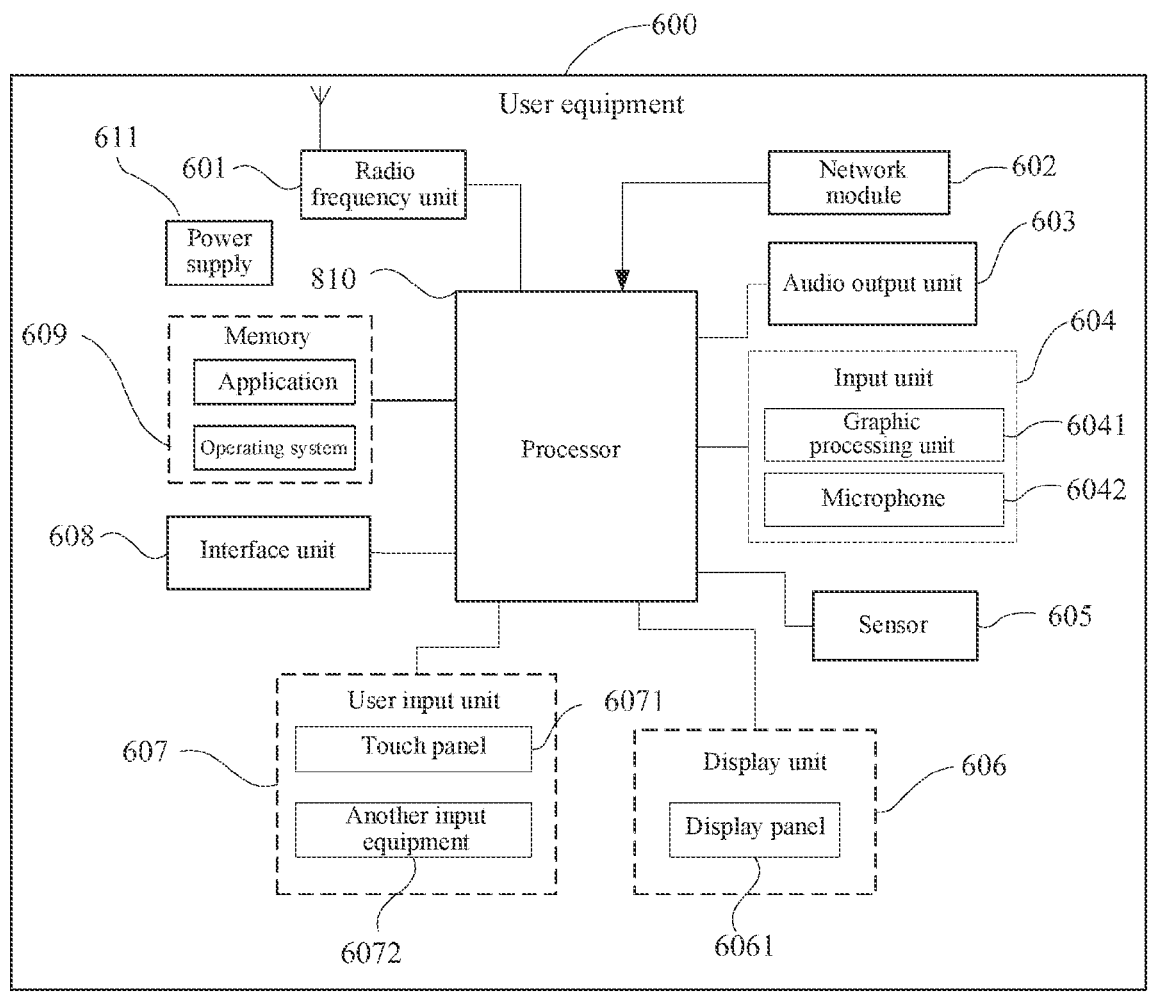
FIG. 7 is a schematic diagram of composition of a network side device according to an embodiment of the present disclosure.

FIG. 7 is a schematic structural diagram of hardware of user equipment for implementing all embodiments of the present disclosure. Refer to FIG. 7. The user equipment 600 includes, but is not limited to: a radio frequency unit 601, a network module 602, an audio output unit 603, an input unit 604, a sensor 605, a display unit 606, a user input unit 607, an interface unit 608, a memory 609, a processor 610 and a power supply 611. A person skilled in the art can understand that the user equipment structure as shown in FIG. 7 is not be construed as limiting user equipment. The user equipment can include more or fewer parts than those in the drawing, combinations of some parts, or arrangement of parts in different ways. In the embodiments of the present disclosure, the user equipment includes, but is not limited to: a mobile phone, a tablet computer, a notebook computer, a palm computer, an on-board terminal, a wearable equipment, and a pedometer.

The processor 610 is configured to receive uplink resources of at least one cell from a network side device, where the uplink resources of each of the cells include at least one SRS resource set; and select, according to a predefined rule, at least one SRS resource set of each of the cells for sending, when in a scenario in which an SRS switches between carriers for sending, where the scenario is configured by the network side device.

The selecting, according to a predefined rule, at least one SRS resource set of each of the cells for sending includes at least one of the following methods:

selecting an SRS resource sets for usage of beam management, codebook-based transmission, non-codebook-based transmission and antenna switching;

selecting one of the SRS resource sets for the same purpose as those on a cell currently with the PUSCH transmission; and selecting an SRS resource set with an SRS resource set mark of N, where N is an integer not less than 0.

The processor 610 is further configured to receive one SRS resource set configured by the network side device of the cell without PUSCH transmission.

The processor 610 is further configured to receive an SRS power control indication from the network side device, and the SRS power control indication is used to indicate the reduced or increased power of at least one SRS resource set of one cell.

Further, the SRS power control indication includes an SRS transmission request and a transmission power indication of at least one SRS resource set list, and the SRS transmission request corresponds to the transmission power indication of the at least one SRS resource set list.

Further, the SRS power control indication includes at least one SRS transmission request and at least one SRS resource set transmission power indication, and the at least one SRS transmission request corresponds to the at least one SRS resource set transmission power indication one by one.

It should be understood that, in the embodiment of the present disclosure, the radio frequency unit 601 can be configured to transmit and receive information, or transmit or receive signals during communication. Specifically, after receiving downlink data from a base station, the radio frequency unit sends the downlink data to the processor 610 for processing. In addition, the radio frequency unit sends the uplink data to the base station. Generally, the radio frequency unit 601 includes, but is not limited to an antenna, at least one amplifier, a transmitter-receiver, a coupler, a low noise amplifier and a duplexer. In addition, the radio frequency unit 601 can further communicate with network and another equipment via a wireless communications system.

The user equipment provides, through the network module 602, users with wireless broadband Internet access, for example, helps users receive and send e-mails, browse web pages and access stream-media, and the like.

The audio frequency output unit 603 can convert audio data received by the radio frequency unit 601 or the network module 602 or stored in the memory 609 into an audio frequency signal, and outputs the audio frequency signal as a sound. In addition, the audio frequency output unit 603 can further provide audio frequency outputs related to specific functions conducted by the user equipment 600 (for example, call receiving sound, and message receiving sound). The audio frequency output unit 603 includes a loudspeaker, a buzzer, a telephone receiver, and the like.

The input unit 604 is configured to receive audio or video frequency signals. The input unit 604 can include a Graphics Processing Unit (Graphics Processing Unit, GPU) 6041 and a microphone 6042. The GPU 6041 processes image data of static pictures or videos obtained by an image capturing device (for example a camera) in a video capturing mode or an image capturing mode. The processed image frames can be displayed on the display unit 606. The image frames processed by the GPU 6041 can be stored in the memory 609 (or another storage medium) or send by the radio frequency unit 601 or the network module 602. The microphone 6042 can receive sounds, and can process such sounds into audio frequency data. The processed audio frequency data can be converted, under the condition that a telephone is in a calling mode, into a format which can be sent by the radio frequency unit 601 to a mobile base station for output.

The user equipment 600 can further include at least one type of sensor 605, for example a light sensor, a motion sensor and another sensor. Specifically, the light sensor includes an ambient light sensor and a proximity sensor. The ambient light sensor can adjust the brightness of a display panel 6061 based on the ambient light intensity. The proximity sensor can switch off the display panel 6061 and/or back light when the user equipment 600 moves close to an ear. As a motion sensor, an accelerometer sensor can detect accelerations in all directions (generally on three axes, can detect gravity and its direction in a static mode, can be configured to recognize postures of the user equipment (for example, switching between portrait screen and landscape screen, related games, magnetometer posture calibration), and can be configured to recognize vibration-related functions (for example pedometer, knock). The sensor 605 can also include a fingerprint sensor, a pressure sensor, an iris sensor, a molecular sensor, a gyroscope, a barometer, a hygrometer, a thermometer, an infrared sensor, and the like, which will not be described in detail herein.

The display unit 606 is configured to display information entered by a user or information provided for the user. The display unit 606 can include a display panel 6061. The display panel 6061 can be configured in form of Liquid Crystal Display (LCD), Organic Light-Emitting Diode (OLED), and the like.

The user input unit 607 can be configured to receive entered number or character information, and generate key signal input related to user settings and function control of the user equipment. Specifically, the user input unit 607 includes a touch panel 6071 and another input equipment 6072. The touch panel 6071, also referred to as a touch screen, can collect user's operations on or near the touch panel 6071 (for example, user's operation on or near the touch panel 6071 with any appropriate object or accessory such as a finger and a touch pen). The touch panel 6071 can include two parts: a touch detection device and a touch controller. The touch detection device detects a touch position of the user and detects a signal generated by the touch operation, and sends the signal to the touch controller. The touch controller receives touch information from the touch detection device, converts the touch information into touch point coordinates, sends the touch point coordinates to a processor 610, and receives and executes a command sent by the processor 610. In addition, the touch panel 6071 can be implemented by various types such as a resistive type, a capacitive type, an infrared ray type or a surface acoustic wave type. In addition to the touch panel 6071, the user input unit 607 can further include another input equipment 6072. Specifically, the another input equipment 6072 can include, but is not limited to, a physical keyboard, function keys (such as keys for voice control, switch keys), a trackball, a mouse and a joystick, which will not be described in detail herein.

Further, the touch panel 6071 can be superposed on the display panel 6061. When the touch panel 6071 detects touch operations thereon or nearby, the touch panel 6071 transmits the touch operations to the processor 610 to determine the type of a touch event. Subsequently, the processor 610 provides corresponding visual output on the display panel 6061 according to the type of the touch event. In FIG. 7, the touch panel 6071 and the display panel 6061 as two separate parts implement input and output functions of the user equipment. However, in some embodiments, the touch panel 6071 and the display panel 6061 can be integrated to implement the input and output functions of the user equipment, which is not specifically defined herein.

The interface unit 608 is an interface configured to connect an external device and the user equipment 600. For example, the external device can include a wired or wireless headphone port, an external power supply (or battery recharger) port, a wired or wireless data port, memory card port, a port for connection with a device having an identification module, an audio Input/Output (I/O) port, a video I/O port, an earphone port, etc. The interface unit 608 can be configured to receive input from the external device (for example, data information and power) and transmits the received input to one or more elements in the user equipment 600, or can be configured to transmit data between the user equipment 600 and the external device.

The memory 609 can be configured to store software programs and various data. The memory 609 can mainly include a program storage area and a data storage area. The program storage area can store an operating system, applications required by at least one function (such as sound play function and image play function), and the like. The data storage area can store data (such as audio data and phone book) created upon use of a mobile phone. In addition, the memory 609 can include a high-speed random access memory, and can further include a nonvolatile memory, for example at least one disk storage device, flash memory or another volatile solid-state storage device.

The processor 610 is a control center of the user equipment, connecting all parts of the user equipment using various interfaces and circuits. By running or executing software programs and/or modules stored in the memory 609 and by calling data stored in the memory 609, the processor 610 implements various functions of the user equipment and processes data, thereby performing overall monitoring on the user equipment. The processor 610 can include one or more processing units. Preferably, the processor 610 can be integrated with an application processor and a modem processor. The application processor mainly processes the operating system, the user interface, applications, and the like. The modem processor mainly processes wireless communication. It can be understood that the foregoing modem processor is not necessarily, integrated in the processor 610.

The user equipment 600 can further include a power supply 611 (for example, a battery) which supplies power to all parts. Preferably, the power supply 611 can be in a logical connection with the processor 610 through a power supply management system, thereby conducting functions such as management on charging and discharging and management on power consumption through the power supply management system.

In addition, the user equipment 600 includes some function modules, which are not shown and will not be described in detail herein.

An embodiment of the present disclosure further provides a computer readable storage medium. The computer readable storage medium stores a computer program. When executed by the processor, the program implements the steps of the SRS transmission method or the steps of the SRS configuration method.

It can be understood that those embodiments described herein can be implemented with hardware, software, firmware, middleware, microcode or their combinations. For implementation with hardware, the processing unit can be implemented in one or more Application Specific Integrated Circuits (ASCI), Digital Signal Processing (DSP), DSP Devices (DSPD), Programmable Logic Devices (PLD), Field-Programmable Gate Arrays (PFGA), general processors, controllers, micro-controllers, microprocessors, and another electronic unit for implementing the functions of the present application, or their combinations.

For implementation with software, the technology described herein can be implemented by executing modules for functions described herein (for example, process and function). Software codes can be stored in the memory and executed by the processor. The memory can be implemented inside or outside the processor.

All embodiments in the Description are described progressively. Each of the embodiments focuses on different point. For identical or similar parts, the embodiments can refer to one another.

A person skilled in the art shall understand that the embodiments of the present disclosure can be provided as methods, devices or computer program products. Therefore, the embodiments of the present disclosure can be complete hardware embodiments, complete software embodiments, or software-hardware combined embodiments. In addition, the embodiments of the present disclosure can be in form of a computer program product, which is implemented in one or more computer accessible storage media (including but not limited to a disk memory, a CD-ROM and an optical memory) including computer accessible program codes.

The embodiments of the present disclosure are described with reference to the flowcharts and/or block diagrams of the methods, user equipment (system), and computer program products thereof. It should be understood that computer program commands can be used to implement each of the procedures and/or blocks in the flowcharts and/or block diagrams, and combinations of procedures and/or blocks in the flowcharts and/or block diagrams. Those computer program commands can be provided in a general computer, a special computer, an embedded processor or another processor which can program data processing user equipment to generate a machine, so that the commands, executed by the computer or another processor that can program data processing user equipment, generate a device for implementing one or more procedures of the flowchart and/or conducting specific functions designed by one or more blocks of the block diagram.

Those computer program commands can be further stored a computer readable memory, which can guide the computer or another processor that can program data processing user equipment, to work in a specific away, so that the commands stored in the computer readable memory generate a manufactured product including a command device. The command device implements one or more procedures in the flowchart and/or one or more blocks in the block diagram.

Those computer program commands can be further loaded in a computer or another programmable user equipment, so that a series of steps are executed in the computer or the programmable user equipment to generate processing for computer implementation, Thus, commands executed in the computer or another programmable user equipment provide steps for implementing one or more procedures of the flowchart and/or steps for conducting functions specified in one or more blocks of the block diagram.

Despite description of the preferred embodiments of the present disclosure, once those skilled in the art know basic creative concepts, they can make changes and modifications to those embodiments. Therefore, the appended claims are intended to be interpreted as including the preferred embodiments and all changes and modifications which fall within the scope of the present disclosure.

It should be noted that in this text the relational terms such as "first" and "second" are merely used to distinguish one object or operation from another object or operation, and not necessarily require or hint that those objects or operations have any such actual relationship or are in such actual sequence. In addition, terms "including", "comprising", or any other variants are used to cover non-exclusive inclusion, so that processes, methods, articles or user equipment, each of which includes a series of factors, include not only those factors but also other unlisted factors, or further include other inherent factors of such processes, methods, articles or user equipment Without more limitations, the factors defined by sentences "including a . . . " do not exclude that the processes, methods, articles or user equipment including the foregoing factors also incorporate other identical factors.

The above embodiments are preferred embodiments of the present disclosure. It should be noted that, within the technical concept of the present disclosure, those ordinarily skilled in the art can make various improvements and modifications, which shall all fall within the protective scope of the present disclosure.

The invention claimed is:

1. A network side device, comprising:
   a memory storing a computer program; and
   a processor coupled to the memory, wherein the computer program, when executed by the processor, causes the processor to perform operations comprising:
   sending uplink resources of at least one cell to user equipment, wherein the uplink resources of each of the at least one cell comprise one or more Sounding Reference Signal (SRS) resource sets;
   configuring, for the user equipment, a scenario in which an SRS switches between carriers for sending, so that the user equipment selects, according to a predefined rule; at least one SRS resource set of each of the at least one cell for sending; and
   sending an SRS power control indication to the user equipment, wherein the SRS power control indication indicates reduced or increased transmission power of at least one of the one or more SRS resource sets of a cell, wherein the SRS power control indication comprises at least one SRS transmission request and at least one SRS resource set transmission power indication, and the at least one SRS transmission request corresponds to the at least one SRS resource set transmission power indication one by one.

2. The network side device of claim 1, wherein sending the uplink resources of the at least one cell to the user equipment comprises:
sending the uplink resources of a cell without a Physical Uplink Shared Channel (PUSCH) transmission to the user equipment, wherein the uplink resources of the cell without the PUSCH transmission comprise an SRS resource set.

3. The network side device of claim 1, wherein:
the SRS power control indication comprises an SRS transmission request and a transmission power indication of at least one SRS resource set list, the SRS transmission request corresponding to the transmission power indication of the at least one SRS resource set list.

4. The network side device of claim 1, wherein the operations further comprise:
sending an SRS power control indication to the user equipment, wherein the SRS power control indication indicates reduced or increased transmission power of at least one of the one or more SRS resource sets of a cell.

5. A non-transitory computer-readable medium storing instructions that, when executed by a processor, cause the processor to perform operations comprising:
receiving uplink resources of at least one cell from a network side device, wherein the uplink resources of each of the at least one cell comprise one or more Sounding Reference Signal (SRS) resource sets;
selecting, according to a predefined rule, at least one SRS resource set of each of the at least one cell for sending, when in a scenario in which an SRS switches between carriers for sending, wherein the scenario is configured by the network side device; and
receiving an SRS power control indication from the network side device, wherein the SRS power control indication indicates reduced or increased transmission power of at least one of the one or more SRS resource sets of a cell,
wherein the SRS power control indication comprises at least one SRS transmission request and at least one SRS resource set transmission power indication, and the at least one SRS transmission request corresponds to the at least one SRS resource set transmission power indication one by one.

6. The non-transitory computer-readable medium of claim 5, wherein selecting, according to a predefined rule, at least one SRS resource set of each of the at least one cell for sending, when in a scenario in which an SRS switches between carriers for sending, wherein the scenario is configured by the network side device comprises at least one of the following:
selecting an SRS resource set for usage of beam management, codebook-based transmission, non-codebook-based transmission, and antenna switching;
selecting an SRS resource set for a same purpose as those on a cell currently with a Physical Uplink Shared Channel (PUSCH) transmission; or selecting an SRS resource set with an SRS resource set mark of N, wherein N is an integer not less than 0.

7. The non-transitory computer-readable medium of claim 5, wherein the operations comprise:
receiving an SRS resource set configured by the network side device of a cell without a Physical Uplink Shared Channel (PUSCH) transmission.

8. The non-transitory computer-readable medium of claim 5, wherein:
the SRS power control indication comprises an SRS transmission request and a transmission power indication of at least one SRS resource set list, the SRS transmission request corresponding to the transmission power indication of the at least one SRS resource set list.

9. A non-transitory computer-readable medium storing instructions that, when executed by a processor, cause the processor to perform operations comprising:
sending uplink resources of at least one cell to user equipment, wherein the uplink resources of each of the at least one cell comprise one or more Sounding Reference Signal (SRS) resource sets;
configuring, for the user equipment, a scenario in which an SRS switches between carriers for sending, so that the user equipment selects, according to a predefined rule, at least one SRS resource set of each of the at least one cell for sending; and
sending an SRS power control indication to the user equipment, wherein the SRS power control indication indicates reduced or increased transmission power of at least one of the one or more SRS resource sets of a cell,
wherein the SRS power control indication comprises at least one SRS transmission request and at least one SRS resource set transmission power indication, and the at least one SRS transmission request corresponds to the at least one SRS resource set transmission power indication one by one.

10. The non-transitory computer-readable medium of claim 9, wherein sending the uplink resources of the at least one cell to the user equipment comprises:
sending the uplink resources of a cell without a Physical Uplink Shared Channel (PUSCH) transmission to the user equipment, wherein the uplink resources of the cell without the PUSCH transmission comprises a SRS resource set.

11. The non-transitory computer-readable medium of claim 9, wherein:
the SRS power control indication comprises an SRS transmission request and a transmission power indication of at least one SRS resource set list, the SRS transmission request corresponding to the transmission power indication of the at least one SRS resource set list.

12. The non-transitory computer-readable medium of claim 9, wherein the operations further comprise:
sending an SRS power control indication to the user equipment, wherein the SRS power control indication indicates reduced or increased transmission power of at least one of the one or more SRS resource sets of a cell.

* * * * *